United States Patent [19]

Von Grumbkow et al.

[11] Patent Number: 5,707,489

[45] Date of Patent: Jan. 13, 1998

[54] PROCESSING WASTEPAPER CONTAINING WAXES, HOT MELTS AND ADHESIVES

[75] Inventors: Michael Von Grumbkow, Heidenheim, Germany; Helmut Konecsny, Baulkham Hills NSW, Australia

[73] Assignee: J.M. Voith GmbH, Heidenheim, Germany

[21] Appl. No.: 788,358

[22] Filed: Jan. 24, 1997

Related U.S. Application Data

[63] Continuation of Ser. No. 379,457, filed as PCT/EP94/01632 May 20, 1994, abandoned.

[30] Foreign Application Priority Data

May 26, 1993 [DE] Germany ............... 43 17 305.5

[51] Int. Cl.⁶ .............................................. D21C 5/02
[52] U.S. Cl. ............................. 162/4; 162/55; 209/168
[58] Field of Search ................... 162/4, 8, 55, 189, 162/62; 209/162, 168

[56] References Cited

U.S. PATENT DOCUMENTS

| | | | |
|---|---|---|---|
| 2,959,513 | 11/1960 | Savage | 162/6 |
| 3,849,246 | 11/1974 | Raymond et al. | 162/4 |
| 4,780,179 | 10/1988 | Clement | 162/5 |
| 5,358,605 | 10/1994 | Dorflinger et al. | 162/4 |

FOREIGN PATENT DOCUMENTS

| | | |
|---|---|---|
| 405218 | 10/1924 | Germany. |
| 3610939 | 6/1987 | Germany. |
| 3804006 | 8/1989 | Germany. |
| 4209880 | 7/1992 | Japan. |

*Primary Examiner*—Donald E. Czaja
*Assistant Examiner*—Dean T. Nguyen
*Attorney, Agent, or Firm*—Baker & Daniels

[57] ABSTRACT

A method of processing recycled paper which contains such a high amount of wax, hot melts or stickies that they would be expected to cause a stoppage of the paper-manufacturing machine. The paper to be recycled is pulped in a pulper and passed on to respective subsequent stages which include a despecker, grader and hydrocyclone. Pulping takes place at a temperature of at least 60° C., and at the same time subjects the paper to a high shear action. The processing line includes a pulp-thickening stage, preferably after the processing stages mentioned, in order to separate off a very high proportion of the wax, hot melts and stickies finely dispersed in the pulper.

4 Claims, 1 Drawing Sheet

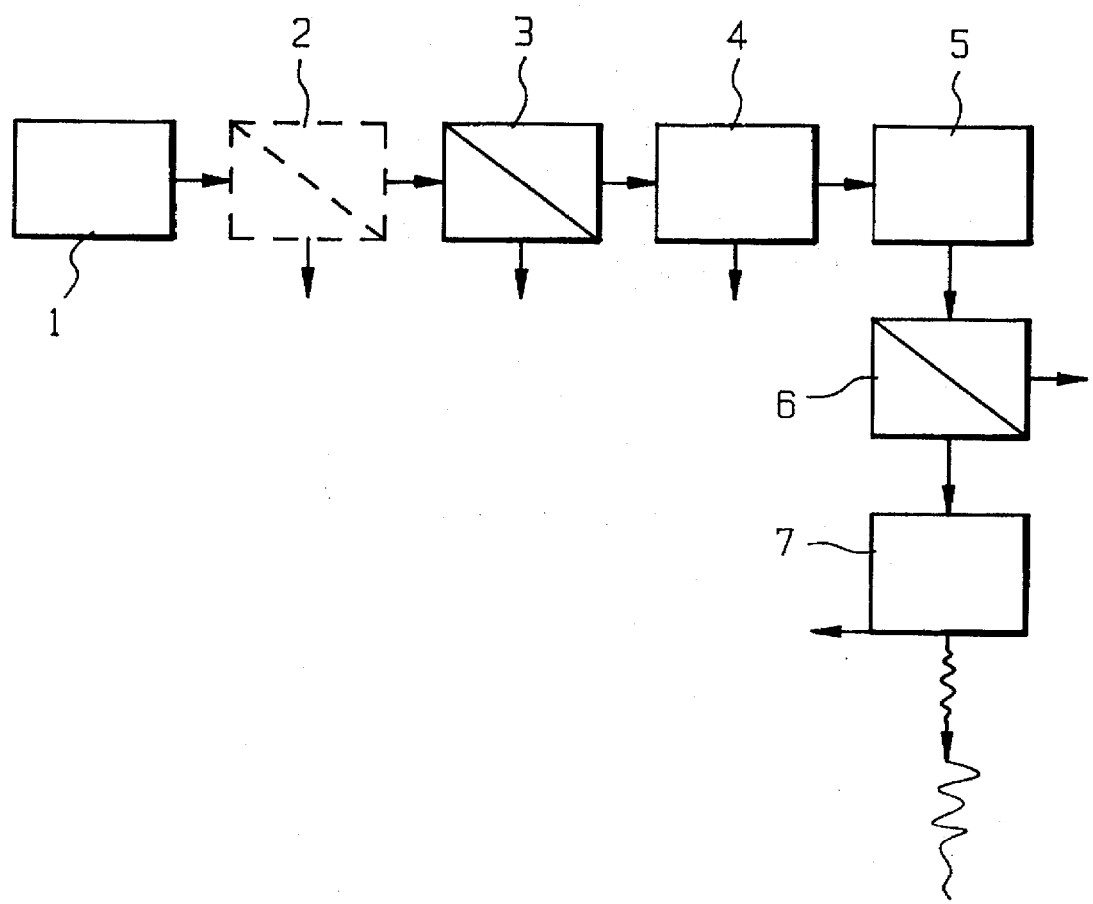

5,707,489

PROCESSING WASTEPAPER CONTAINING WAXES, HOT MELTS AND ADHESIVES

This is a continuation of application Ser. No. 08/379,457, filed as PCT/EP94/01632 May 20, 1994, now abandoned.

BACKGROUND OF THE INVENTION

The invention concerns a method for processing waste paper. Concerned is a customary method as far as it relates to the apparatuses, namely pulpers, despeckers, graders and hydrocyclones (cleaners).

The problem underlying the invention is the presence of waxes, hot melts and other adhesives (stickies) in the waste paper which can be removed from the recycled paper only with difficulty and lead to considerable complications, notably on the paper machine. Also other processing apparatuses, specifically those mentioned, may be affected thereby.

SUMMARY OF THE INVENTION

The inventional method disperses greatly and finely the stickies proportion and waxes in the pulper, under a high shear effect at temperatures of at least 60° C., allowing a separation along with the filtrate of the decker. The proportion of sticky ingredients and waxes in the entire recycled paper may be inadmissible already at 0.1%, since the relevant difficulties occur already then. With a high proportion of brown papers, or brown grades, the share of stickies and waxes often may range even at 8%.

The inventional method introduces an extensive cleaning, due to the dispersion of waxes and stickies, thereby practically avoiding the said difficulties. The mentioned share of waxes derives for the most from waxed cardboard.

It is generally sufficient to have a temperature of at least 60° C., but it may be chosen also somewhat higher, and the processing time in the pulper, to accomplish dispersion, ranges generally between 15 and 30 minutes.

Preference for the cleaning of the decker filtrate goes to microflotation, or also some other flotation with an appropriate filter, with disk filters being customary, as is known.

BRIEF DESCRIPTION OF THE DRAWING

The inventive process is illustrated in the FIGURE, wherein the process components are schematically shown.

DESCRIPTION OF THE PREFERRED EMBODIMENTS

The appropriate apparatuses are indicated in the FIGURE, with 1 referencing the pulper into the which the recycled paper is passed along with the pulping chemicals, then a despecker 2, as the case may be, and then graders, for instance a turboseparator 3 (also called turbograder) and further screen type graders 4 (preferably the known sifters, for example vertical sifters), then hydrocyclones 5 (often also called cleaners). Finally, the decker is referenced 6. Required side circuits for the proportions of rejects are not shown here in any detail. The decker is followed, as regards the filtrate proportion, by the microflotation stage 7. Obtained here is reusable clear water along with a share of discardable dirt that contains the stickles and waxes.

The temperature in the pulper can be produced preferably by introduction of steam. Also possible, though, is the use of water heated by means of heat exchangers.

Maintenance of a temperature of less than or maximally 50° C. is recommended in the decker, leaving the stickles and wax particles relatively firm for better passage through the filter fabric. When using in the pulper a temperature not very much higher than 60° C., natural heat radiation causes in any event a temperature drop to the mentioned limit value or below, on the way to the decker 6.

Also a stickles separation is to be expected at a higher temperature.

With sufficient dispersion, about 80% of the waxes and stickles can be separated along with the decker filtrate. Required to that end are appropriately high shear forces in the pulper, which are achieved by running the rotor that is customary today and provided with helix surfaces at high speeds of rotation. Favorable for that purpose is also a high consistency of at least 8%.

We claim:

1. A method for processing waste paper, said waste paper including impurities selected from the group consisting of waxes, hot melts and adhesives, said impurities being present in said waste paper in a range of from about 0.1 to about 8 wt. %, the method comprising the steps of:
   (a) pulping the waste paper into a slurry in a pulper, said pulping step occurring at a temperature of at least 60° C., and with a high shear effect upon the waste paper in the pulper, whereby the impurities disperse greatly and finely in said slurry;
   (b) treating the slurry in further processing stages using a deflaker, a grader and a hydrocyclone, respectively;
   (c) thickening the slurry from step (b) in a thickener at a temperature of maximally 50° C., thereby leaving the impurities with a firmness suitable for passage through a filter in said thickener, and filtering said thickened slurry through the filter such that a thickener filtrate is produced, wherein said filtrate includes about 80% of said impurities; and
   (d) cleaning said filtrate containing said impurities by at least one of microflotation, filtration or selective flotation.

2. The method of claim 1, wherein the consistency of waste paper in the pulper is at least about 8%.

3. A method for processing waste paper, said waste paper including impurities selected from the group consisting of waxes, hot melts and adhesives, said impurities being present in said waste paper in a range of from about 0.1 to about 8 wt. %, the method comprising the steps of:
   (a) pulping the waste paper into a slurry in a pulper, said pulping step occurring at a temperature of at least 60° C., and with a high shear effect upon the waste paper in the pulper, said shear effect being sufficient to finely divide said impurities and to disperse said freely-divided impurities in said slurry, said waste paper in the pulper having a consistency of at least about 8%;
   (b) treating the slurry in further processing stages, said further processing stages comprising a deflaker, a grader and a hydrocyclone;
   (c) thickening the slurry from step (b) in a thickener at a temperature of maximally 50° C. such that the impurities maintain firmness suitable for passage through a filter in said thickener, and filtering said thickened slurry through the filter such that a thickener filtrate is produced, said filtrate including about 80% of said impurities; and
   (d) cleaning said filtrate containing said impurities by at least one of microflotation, filtration or selective flotation.

4. The method of claim 3, wherein the consistency of waste paper in the pulper is about 8%.

* * * * *

UNITED STATES PATENT AND TRADEMARK OFFICE
CERTIFICATE OF CORRECTION

PATENT NO. : 5,707,489
DATED : January 13, 1998
INVENTOR(S) : Michael Von Grumbkow et al.

It is certified that error appears in the above-indentified patent and that said Letters Patent is hereby corrected as shown below:

Claim 3, column 2, beginning on line 48, after "disperse said", replace "freely-divided" with -- finely-divided --.

Signed and Sealed this

Fourteenth Day of April, 1998

Attest:

BRUCE LEHMAN

Attesting Officer     Commissioner of Patents and Trademarks